(12) United States Patent
Gopalakrishnan et al.

(10) Patent No.: US 11,128,782 B1
(45) Date of Patent: Sep. 21, 2021

(54) ADAPTIVE AUTOCOLOR DETECTION BASED ON MEDIA COLOR

(71) Applicant: Xerox Corporation, Norwalk, CT (US)

(72) Inventors: Sainarayanan Gopalakrishnan, Medavakkam (IN); Vignesh Doss, Palani Chettipatti (IN); Rajasekar Kanagasabai, Medavakkam (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/812,652

(22) Filed: Mar. 9, 2020

(51) Int. Cl.
*H04N 1/60* (2006.01)
*H04N 1/40* (2006.01)

(52) U.S. Cl.
CPC ....... *H04N 1/6005* (2013.01); *H04N 1/40012* (2013.01); *H04N 1/6022* (2013.01)

(58) Field of Classification Search
CPC . H04N 1/6005; H04N 1/40012; H04N 1/6027
USPC ........ 358/1.9, 2.1, 3.24, 1.18, 520, 523, 538
See application file for complete search history.

(56) References Cited

U.S. PATENT DOCUMENTS

| | | | |
|---|---|---|---|
| 6,934,412 B2 | 8/2005 | Bares | |
| 6,972,866 B1 | 12/2005 | Bares et al. | |
| 2004/0052429 A1* | 3/2004 | Curry | G06T 5/40 382/274 |
| 2006/0274376 A1* | 12/2006 | Bailey | H04N 1/4074 358/3.26 |
| 2007/0160289 A1* | 7/2007 | Lipton | G06K 9/38 382/173 |
| 2008/0079962 A1* | 4/2008 | Torikoshi | G06K 15/186 358/1.9 |

* cited by examiner

*Primary Examiner* — Jamares Q Washington
(74) *Attorney, Agent, or Firm* — Fay Sharpe LLP

(57) ABSTRACT

A method for detecting background color of a scanned document uses dynamic weights to adjust components of the L*a*b* color space. In accordance with one aspect of the disclosure, the L*a*b* values belonging to pixels within a block are applied to a series of thresholds. In response to the L*a*b* values meeting the thresholds, a given color pixel within the block is reclassified as being monochromatic. The weight values are dynamically updated based on at least one of the L*a*b* values of the given pixel. The thresholding is repeated for remaining pixels in the document. Using the classified pixels, an output document is generated where the background pixels are monochromatic. The output document is transmitted to a display device in communication with the server computer.

18 Claims, 5 Drawing Sheets
(3 of 5 Drawing Sheet(s) Filed in Color)

ADAPTIVE AUTOCOLOR DETECTION BASED ON MEDIA COLOR

BACKGROUND

The present disclosure relates to digital printing. It finds particular application in conjunction with detecting color objects in a scanned image and will be described with particular reference thereto. It will be appreciated, however, that the invention is also amenable to other like applications.

At times, it is desirable to differentiate neutral monochromatic (e.g., gray) pixels from color pixels in an image. For example, electronic documents on color media or color background may want to be stored or printed on monochrome background, without effecting the color content, such as images, graphics and text. Auto color detection is used to classify document type as gray or color. The existing approach for differentiating pixels is referred to as auto color detection. Auto color detection is a block-based approach that operates on a reduced L*a*b* image.

In other words, the conventional approach for detecting the background color of an original scanned image is to determine neutral colors using block averages within the L*a*b* color space. For a given pixel, an average is computed for each of the L*, a* and b* components in a block including the group of pixels surrounding the given pixel. The block averages are applied to a fixed threshold T, which can be set as the minimum color pixel count. If $a^*_{avg}{}^2 + b^*_{avg}{}^2 < T_n(L^*_{avg})$, then the averaged components ($L^*_{avg}$, $a^*_{avg}$, $b^*_{avg}$) are determined to represent a neutral color. Otherwise the average components ($L^*_{avg}$, $a^*_{avg}$, $b^*_{avg}$) are determined to represent a non-neutral color. The accountable pixels are estimated from each block. The final decision on whether the document type is gray (i.e., neutral) or color is determined based on the number of accountable pixels.

Another conventional approach compares the L*a*b* components of a given pixel to fixed upper and lower thresholds. If any of the component values of the given pixel represent a close-to-neutral color (i.e., within the range between the upper and lower thresholds), that color component value is replaced with a neutral value (e.g., 128 on a scale between 0 and 255).

After the chroma calculations are performed for the full document, every pixel is associated with a binary neutral "0" or non-neutral "1" tag. The tags are then used to generate a color or neutral page of an output document.

The conventional color detections are used to determine whether the input document is gray or color (hereinafter referred to as "type") based on the number of accountable pixels. The conventional approaches would classify any document on color media or with a color background as being "color" regardless of the content type. This classification may result in detection failures, particularly when documents are printed on recycled media. Industries such as financial institutions suffer from this problem because they routinely handle forms on recycled media. As a result, the colored content (e.g., text, print) can become more difficult to distinguish in a scanned image that is detected in color. For example, FIGS. 1A and 2A show sample output after the conventional process was performed on scanned documents. The documents are shown as deposit slips having background media colors of yellow and green, respectively. The text is obscured in some places or difficult to read.

An improved approach is desirable which would exclude the media color to estimate the document type.

BRIEF DESCRIPTION

One embodiment of the disclosure relates to a computer-implemented method for detecting background color of a scanned document. For a given pixel (i,j), a block of pixels around the given pixel is used. In accordance with one aspect of the disclosure, each pixel in the block has a respective luminance L* and chroma a* and b* value. The L*a*b* values are applied to a series of thresholds. In response to the L*a*b* values meeting the thresholds, the pixel is classified as being monochromatic. In accordance with one aspect of the disclosure, predetermined weight values—stored in a memory—are dynamically updated based on at least one of the L*a*b* values of the given pixel. The thresholding is repeated for remaining pixels in the document. Using the classified pixels, an output document is generated including a monochrome background. In one embodiment, the background of the input (scanned) document is color, and the background of the output document is monochrome. The output document is transmitted to a display device in communication with the server computer.

Another embodiment of the disclosure is directed to a system for detecting background color of a scanned document. The system includes a non-transitory storage device having stored thereon instructions for performing the background detection. The system further includes at least one hardware processor being part of a computing device and configured to execute the instructions. For a given pixel (i,j), a block of pixels around the given pixel is used. In accordance with one aspect of the disclosure, each pixel in the block has a respective luminance L* and chroma a* and b* value. The L*a*b* values are applied to a series of thresholds. In response to the L*a*b* values meeting the thresholds, the pixel is classified as being monochromatic. In accordance with one aspect of the disclosure, predetermined weight values—stored in a memory—are dynamically updated based on at least one of the L*a*b* values of the given pixel. The thresholding is repeated for remaining pixels in the document. Using the classified pixels, an output document is generated including a monochrome background. In one embodiment, the background of the input (scanned) document is color, and the background of the output document is monochrome. The output document is transmitted to a display device in communication with the server computer.

One embodiment of the disclosure relates to a computer-implemented method for detecting background color of a scanned document. For a given pixel (i,j), a block of pixels around the given pixel is used. In accordance with one aspect of the disclosure, each pixel in the block has a respective luminance L* and chroma a* and b* value. The L*a*b* values are applied to a series of thresholds. In response to the L*a*b* values meeting the thresholds, the content pixel is classified as being monochromatic. A stored luminance value matching the luminance of the given content pixel is assigned a new weight value of zero "0". In accordance with one aspect of the disclosure, predetermined weight values—stored in a memory—are dynamically updated based on at least one of the L*a*b* values of the given pixel. The thresholding is repeated for remaining pixels in the document. Using the classified pixels, an output document is generated including monochrome content. In one embodiment, the background of the input (scanned) document is color, and the background of the output document is color, while the content of the scanned document is color and the content of the output document is monochromatic. The output document is transmitted to a display device in communication with the server computer.

BRIEF DESCRIPTION OF THE DRAWINGS

The patent or application file contains at least one drawing executed in color. Copies of the patent or patent application publication with color drawing(s) will be provided by the Office upon request and payment of the necessary fee.

Figures 5A, 5B:
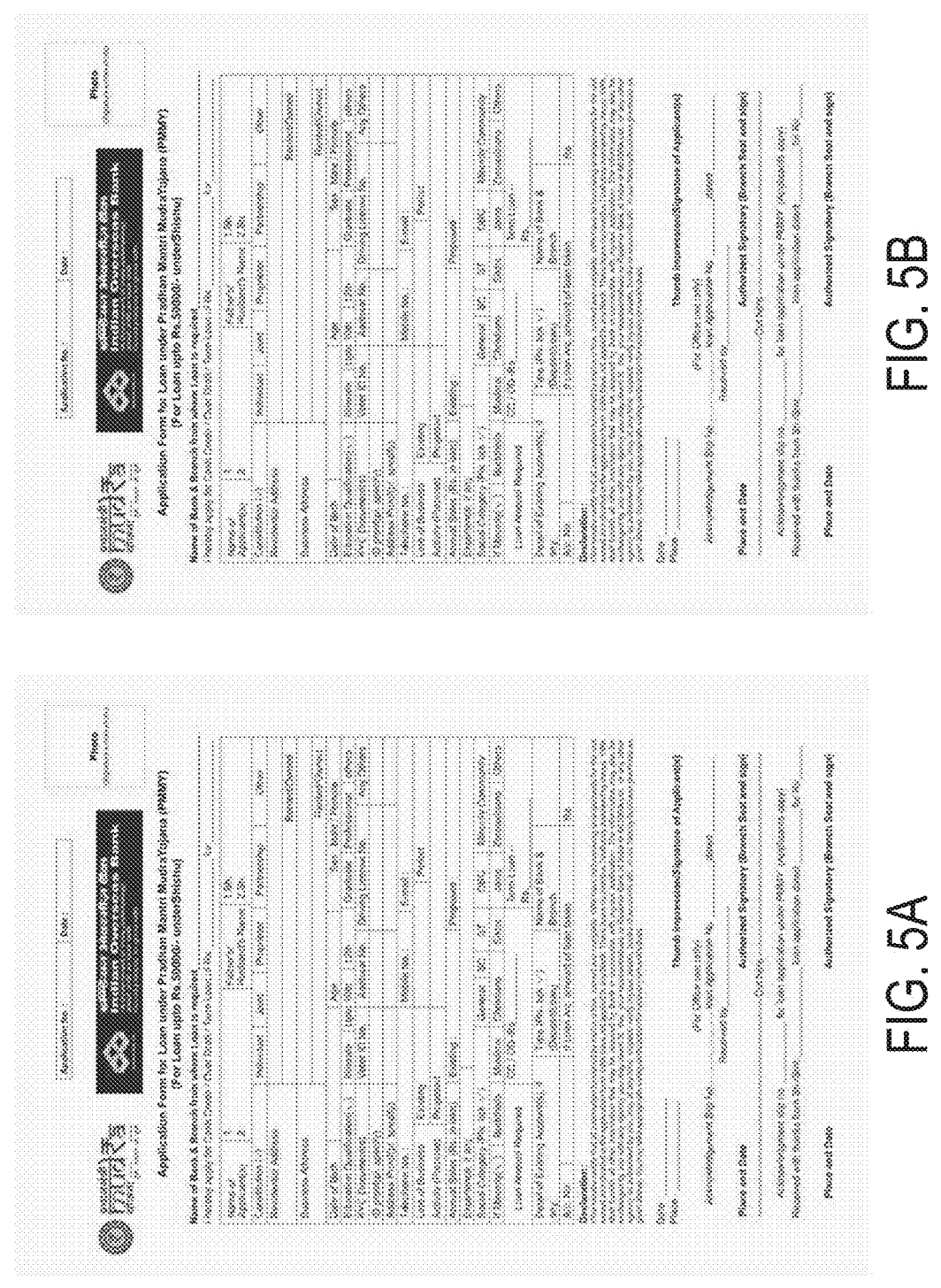

FIG. 5A is an illustrative input document.

FIG. 5B is a sample output document after performing the method disclosed herein on the input document of FIG. 5A.

DETAILED DESCRIPTION

The present disclosure relates to an adaptive auto color detection approach to estimate a document type. It employs a dynamic luminance threshold and a background estimation to classify a document as neutral or color. The new approach excludes media color.

The conventional approach uses defined weights to determine the pixel color accountability. The disclosed approach employs dynamic weights to determine pixel color accountability, which is used to identify the color of the document paper or media. In the disclosed approach, the ranges that are used for determining the document background color are assigned to lower weights using the dynamic weight values.

Figure 3:
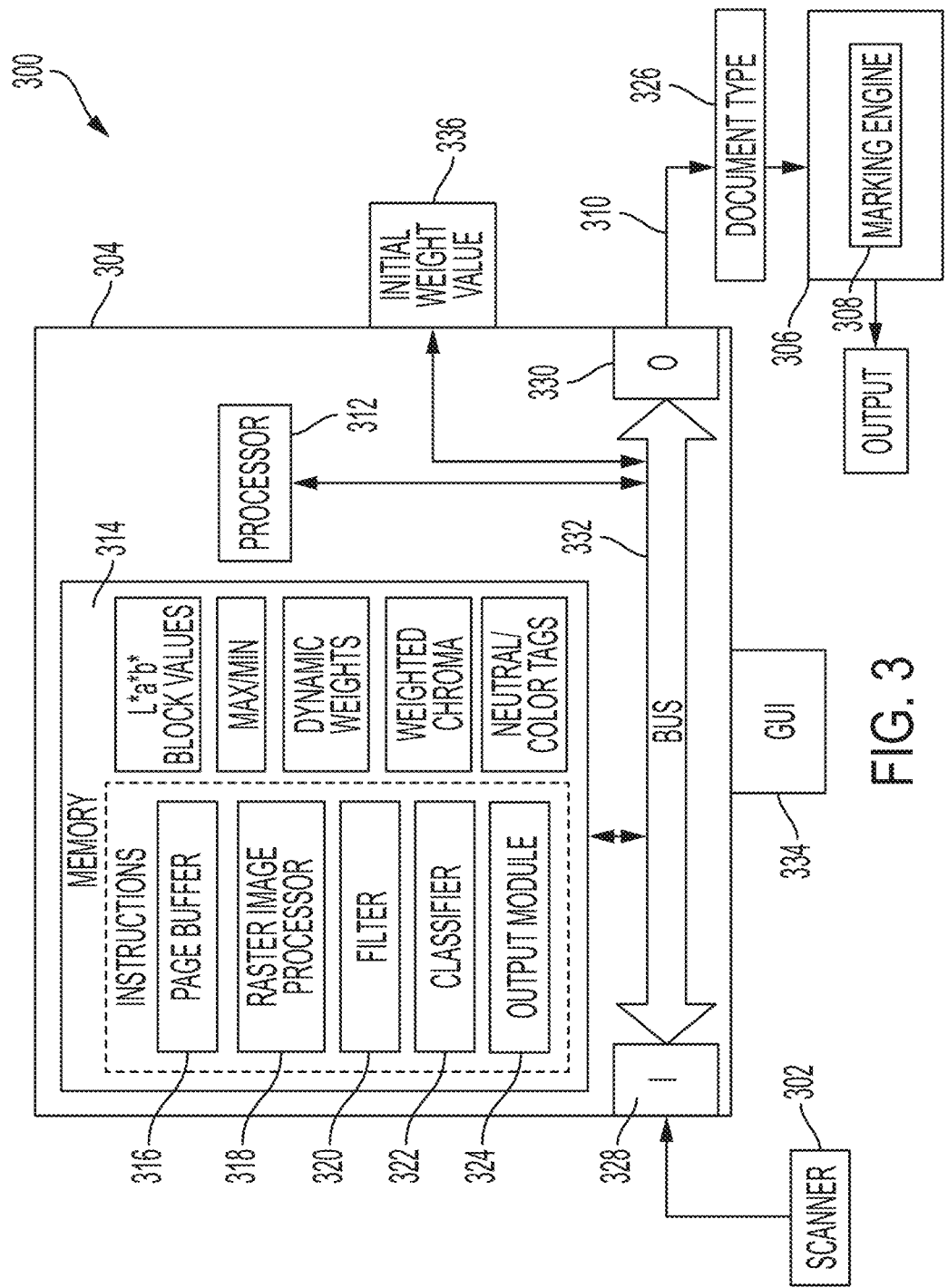
FIG. 3 is a schematic illustration of a system for detecting background color according to one aspect of the exemplary embodiment.

FIG. 3 a schematic illustration of a system 300 for detecting background color according to one aspect of the exemplary embodiment. The system 300 may include an input device 302, including a scanner; a processing system, hosted by a computing device 304 such as a digital front end ("DFE") or controller; and an output device, such as a display, image forming apparatus or printer device 306, including a marking engine or similar rendering device 308, which are linked together by communication links 310, referred to herein as a network. These components are described in greater detail below.

The computing device 304 illustrated in FIG. 3 includes a processor 312, which controls the overall operation by execution of processing instructions, which are stored in memory 314 connected to the processor 312.

The document processing operation disclosed herein is performed by the processor 312 according to the instructions stored in the memory 314. In particular, the memory 312 stores a page buffer 316; a raster image processor 318; a filter 320; a classifier 322; and an output module 324. These modules 316-324 will be later described with reference to the exemplary method. In general, the modules 316-324 take an instruction and the image data from an original document, received as input in electronic form, and processes the document for estimating a document type 326.

The computing device 304 includes one or more communication interfaces (I/O), such as network interfaces 328, 330 for communicating with external devices, such as the display or printer device 306. The various hardware components 312, 314 (including random access memory "RAM" (not shown)) of the computing device 304 may all be connected by a bus 332.

With continued reference to FIG. 3, the computing device 304 is communicatively linked to a user interface device (GUI) 334 via a wired and/or wireless link. In various embodiments, the user interface device 334 may include one or more of a display device, for displaying information to users, and a user input device, such as a keyboard or touch or writable screen, for inputting instructions and/or receiving a visual display of the output, and/or a cursor control device, such as a mouse, trackball, or the like, for communicating user input information and command selections to the processor 312. Specifically, the user interface device 334 includes at least one of an input device and an output device, both of which include hardware, and which are communicatively linked with the computing device 304 or the output device 306 via wired and/or wireless link(s).

As mentioned, the computing device 304 of the system 300 is communicatively linked with the printer 306 via link 310. While the computing device 304 may be linked to as few as one printer 306, in general, it can be linked to a fleet of printers. The exemplary printers 306 may each include the marking engine 308, which applies marking medium, such as ink or toner, to a substrate, such as paper, using, for example, a laser, inkjet, thermal, or other transfer process. The printer 306 renders images on print media, such as paper, and can be a copier, laser printer, bookmaking machine, facsimile machine, or a multifunction machine (which includes one or more functions such as scanning, printing, archiving, emailing, and faxing). In one embodiment, the input device (e.g., scanner) and output device (e.g., printer) can belong to a multifunction machine. In another embodiment, the input device (e.g., image capture device) and output device (e.g., remote display) can belong to the same computing device being the same or different from computing device 304.

The memory 314 may represent any type of tangible computer readable medium such as random-access memory (RAM), read only memory (ROM), magnetic disk or tape, optical disk, flash memory, or holographic memory. In one embodiment, the memory 314 may each comprise a combination of random-access memory and read only memory. The digital processor 312 can be variously embodied, such as by a single-core processor, a dual-core processor (or more generally by a multiple-core processor), a digital processor and cooperating math coprocessor, a digital controller, or the like. The digital processors 312 in addition to controlling the operation of the computing device 304, executes instructions stored in the modules 316-324 for performing the parts of the method outlined below.

The software modules 316-324 as used herein, are intended to encompass any collection or set of instructions executable by the system 300 to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 328, 330 may include, for example, a modem, a router, a cable, and and/or Ethernet port, etc.

As will be appreciated, while computing device 304 and printer 306 are illustrated by way of example, the system 300 may be hosted by fewer or more linked computing devices. Each computing device may include, for example, a server computer, desktop, laptop, or tablet computer, smartphone or any other computing device capable of implementing the method described herein. Alternatively, the computing device 304 can be incorporated in the multifunction printer device 306.

Figure 4:
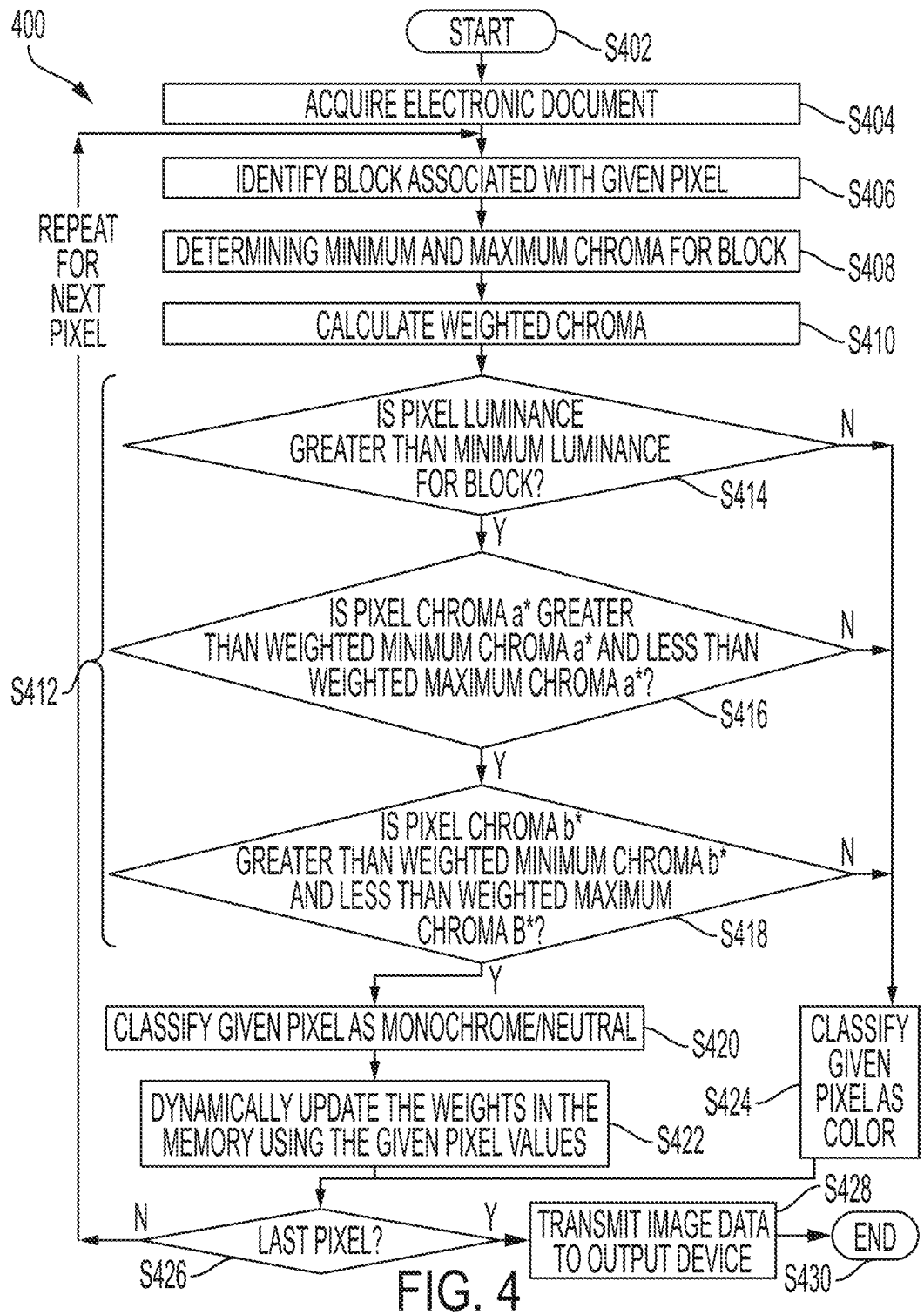
FIG. 4 is a flowchart showing the method according to one embodiment of the disclosure.

Now with reference to FIG. 4, a method 400 for detecting background color of a scanned document is shown. The method starts at S402. The disclosed process is performed on an electronic document received at the computing device 304 of system 300. In one embodiment, a copy of the document can be scanned at a scanner device and transmitted to the page buffer 316 of system 300. Alternatively, the document can be captured using a camera in communication with the system. Additionally, stored image data can be acquired from a memory or database 336 that is in communication with the computing device 304. At S404, the document is received at the page buffer 316.

Each of the pixels within the document (hereinafter also referred to as "image") is associated with a color identifier. A raster image processor (RIP) 318 rasterizes the image by transforming pixels within the image into components of a first (e.g., the red-green-blue (RGB)) color space. The components of the RGB color space serve as the color identifiers of the respective pixels. The RGB image data is transformed into a second L*a*b* color space; however, it is to be understood that other color (e.g., the L*C*h*) spaces are also contemplated.

Neutral colors in the disclosed embodiment are determined within the L*a*b* color space, which is generally defined using three (3) components (axes). Two of the components, referred to as chroma a* and b*, define the amounts of yellow, blue, red, and green in a pixel and, therefore, are referred to as the color components. The a* axis transitions from red to green and the b* axis transitions from blue to yellow. The L* component defines the lightness/darkness of the pixel and, therefore, is referred to as the neutral component. Because the L* axis transitions from black to white, positions along the L* axis represent different gray-scale levels. The point at which the three axes intersect represents the color black.

In the present disclosure, the input image may include black-&-white (B&W) and/or color. A block-based approach is performed on a given page of the document. At S406, the filter 320 identifies a subgroup of a predetermined number of pixels within the image. For a given pixel (i,j), the subgroup is a block of pixels around the given pixel (except for pixels included in single pixel lines along the edges). In one embodiment, the smallest filter (i.e., sub-group of pixels) includes the number of pixels (e.g., 9 pixels) in a halftone cell. It is to be understood that other blocks are contemplated that include a larger number of pixels. Each pixel in the block has a respective luminance L* and chroma a* and b* value.

At S408, the filter 320 searches the intensity values among all pixels in the block to determine the minimum intensity value for the chroma a* in the block; the maximum intensity value for the chroma a* in the block; the minimum intensity value for the chroma b* in the block; and the maximum intensity value for the chroma b* in the block. The maximum and minimum intensity values are adjusted using a dynamic weight value to determine pixel accountability. If the given pixel (Q) is the first pixel to be processed for the document, then the computing device 304 acquires initial predetermined weight values stored in the storage device or memory 336. In one embodiment, different weight values are to be applied to the minimum intensity values and maximum intensity values. In the illustrative embodiment, the initial weight value $t_3$ to be applied to the minimum intensity values is 0.85 and the initial weight value $t_4$ to be applied to the maximum intensity values is 1.15. At S410, weighted chroma are calculated. A weighted minimum chroma a* is generated by multiplying the minimum intensity value to the predetermined weight $t_3$. Similarly, a weighted maximum chroma a* is generated by multiplying the minimum intensity value to the predetermined weight $t_4$; a weighted minimum chroma b* is generated by multiplying the minimum intensity value to the predetermined weight $t_3$; and a weighted maximum chroma b* is generated by multiplying the minimum intensity value to the predetermined weight $t_4$. The weighed minimum and maximum chroma a* and b* are assigned as dynamic threshold values.

The classifier 322 performs a thresholding operation at S412 using the dynamic threshold values. The classifier uses L*a*b* values for the given pixel (i,j) are applied to a series of thresholds to determine if a neutral/non-neutral tag is attached to the given pixel (i,j). A determination is made, whether:

if $[L(i,j) > L\_min]$ & $[(a\_min * t_3) < a*(i,j)$ $< (a\_max * t_4)]$ & $[(b\_min * t_3) < b*(i,j) < (b\_max * t_4)]$ where:

L_min represents the minimum intensity value for the block;

$a\_min * t_3$ represents the weighted minimum intensity value a*;

$a\_max * t_4$ represents the weighted maximum intensity value a*;

$b\_min * t_3$ represents the weighted minimum intensity value b*; and $b\_min * t_4$ represents the weighted maximum intensity value b*.

Once the threshold values are calculated, the L*a*b* values for the given pixel (i,j) are applied to the series of thresholds. In other words, each of the L*, a* and b* values are applied to a threshold. At S414, the luminance value L for the current pixel (i,j) is compared to the minimum luminance value for the block. At S416, the chroma a* value for the given pixel (i,j) is compared to the weighted minimum and maximum chroma a* for the block. At S418, the chroma b* value for the given pixel (i,j) is compared to the weighted minimum and maximum chroma b* for the block. More specifically, the system determines if the following thresholds are met: (1) if the luminance value L for the current pixel (i,j) is greater than the minimum luminance value for the block; (2) if the chroma a* value for the given pixel (i,j) is greater than the weighted minimum chroma a* for the block and less than the weighted maximum chroma a* for the block; and (3) if the chroma b* value for the given pixel (i,j) is greater than the weighted minimum chroma b* for the block and less than the weighted maximum chroma b* for the block. In response to the L*a*b* values of the given pixel (id) meeting the series of thresholds (YES at S414-S418), the classifier determines that the given pixel (i,j) is monochromatic (also referred to herein as neutral or gray) at S420 and attaches a neutral tag to the given pixel (i,j). In other words, if all the thresholds are met, the color component values of the given pixel (i,j) are determined to represent a neutral or close-to-neutral color (i.e., within the range between the dynamic thresholds). The color component values of the given pixel (0 represent the background level.

The luminance L* of the given pixel (i,j) is treated as a monochrome and is used for assigning new weights—that is, updating the predetermined weights in the memory at S422. The updated/new weights will be used for processing the next pixel. As an illustrative example, if the background level determined in the previous step's Most Significant Bit (MSB) is in the range of 100, then the corresponding new weight value is zero (0).

| 3 MSBs of avg_L[i] | c1 (Default weights) | New Weights |
|---|---|---|
| 000 | 9 | 9 |
| 001 | 8 | 8 |
| 010 | 7 | 7 |
| 011 | 6 | 6 |
| 100 | 6 | 0* |
| 101 | 6 | 6 |
| 110 | 6 | 6 |
| 111 | 5 | 5 |

Where * represents the new weight value for updating the predetermined weights. This means that the threshold values used to process the next pixel can be different from the values used to process the given pixel. The disclosed method replaces weight values in the memory if the given pixel is classified as neutral pixel at S422.

In response to the L*a*b* values of the given pixel (i,j) not meeting any one of the series of thresholds (NO at S414, S416 or S418), the classifier determines that the given pixel (i,j) is a color pixel (also referred to herein as nonneutral or nonneutral color) at S424.

The output module 324 generates a binary output as a function of the classifications. The tag associated with the given pixel (i,j) is merged with other tags associated with the pixel. If the given pixel (i,j) is determined to be a process neutral color, a tag of zero (0) is added to the other tags attached to the given pixel. On the other hand, if the given pixel (i,j) is determined to be a nonneutral color, a tag of one (1) is added to the other tags attached to the given pixel.

The steps S406-S424 are repeated for remaining pixels in the document. Then, a determination is made whether all the pixels in the document have been processed at S426. If all the pixels have been processed (YES at S426), the output module 324 transmits the image data to an output device (e.g., a color printing device such as a color printer or color facsimile machine) at S428. In another embodiment, the image data can be transmitted to a display device.

Figure 1A:
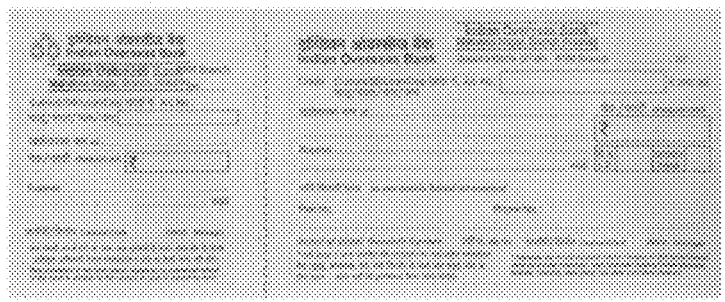
FIG. 1A is sample output document using a conventional approach.
Figure 1B:
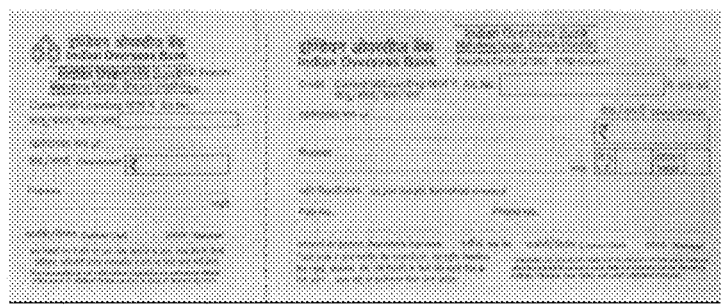
FIG. 1B is sample output document for the input document of FIG. 1A using the method disclosed herein.
Figure 2A:
FIG. 2A is sample output document using a conventional approach.
Figure 2B:
FIG. 2B is sample output document for the input document of FIG. 2A using the method disclosed herein.

In one embodiment, an image is rendered by the output device 306. In the preferred embodiment, the output device is a color printing device such as a digital color printer or digital color facsimile machine. However, analog output devices are also contemplated. The output device uses the tags to generate the document according to known approaches. For example, the L*a*b* data can be transformed into a CMYK color space. The output document will include monochrome background even if the original scanned document had a color background or was on color media. FIGS. 1B and 2B show sample output documents after the disclosed process was performed on scanned documents. The improvement over the conventional method is viewable when comparing the output of FIG. 1A with 1B or the output of FIG. 2A with 2B. In the conventional approach, the color detection operation being performed on the scanned or electronic input images (not shown) would result in a background color detection. This is viewable in FIGS. 1A and 2A. This is because the thresholds are fixed. However, in the disclosed approach, the dynamic color detection operation being performed on the scanned or electronic input images (not shown) would result in a background monochromatic or neutral detection. This is viewable in FIGS. 1B and 2B. Therefore, improved clarity and readability is readily apparent from the dynamic thresholding approach.

The disclosed approach does not always output a monochrome background document. FIG. 3A shows an input document being a form. The form includes black text and colored content that was originally printed on yellow media. When the disclosed approach is performed on the form, a color classification or output is generated. The output, shown in FIG. 3B, is visibly sharper than the electronic input. The method ends at S430.

In another embodiment of the present disclosure, the color detection can be performed on the foreground content instead of the background. The process is similar to the one described above in FIG. 4, except that the processing is transforms a given foreground (content) pixel instead of a background pixel. In response to the L*a*b* values of a given content pixel meeting the series of thresholds, the content pixel is classified as being monochromatic. The stored luminance value L* matching the luminance of the given content pixel is reassigned the new weight value of zero "0". The output document would instead include monochromatic foreground content (e.g., text, graphics, etc.) on the color background.

One aspect of the present disclosure is improving the quality and readability of the output. Example users that would benefit from employing the disclosed approach are industries and customers that handle bills, forms and documents printed in recycled media. By improving the output, the dynamic thresholding feature further improves user experience and billing benefits.

Another aspect of the present disclosure is that it can be integrated into a software-based image path.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for detecting background color of a scanned document, the method comprising:

at a server computer:
in response to acquiring a scanned document, obtaining predetermined weight values stored in a memory;
detecting the background color of the scanned document, the detecting comprising:
(a) for a given pixel (i,j), identifying a block of pixels around the given pixel, each pixel in the block having a respective luminance L* value and chroma a* and b* values;
(b) applying the L*a*b* values of the given pixel to a series of thresholds, the thresholds being based on weighted intensity values in the block, wherein the series of thresholds are selected from the group consisting of: (i) the luminance value for the current pixel (i,j) being greater than the minimum luminance value for the block, (ii) the chroma a* value for the current pixel (i,j) being greater than the weighted minimum chroma a* for the block and less than the weighted maximum chroma a* for the block, and (iii) the chroma b* value for the current pixel (i,j) being greater than the weighted minimum chroma b* for the block and less than the weighted maximum chroma b* for the block;

(c) in response to the L*a*b* values of the given pixel meeting the series of thresholds,
classifying the pixel as being monochromatic and dynamically updating the predetermined weight values in the memory based on at least one of the L*a*b* values of the given pixel;

repeating steps (a)-(c) for remaining pixels in the document;

generating an output document using the classified pixels, the output document including a monochrome background; and transmitting the output document to a display device in communication with the server computer.

2. The method according to claim 1 further comprising:
determining minimum and maximum intensity values in the block for the chroma a* and b*;
generating weighted minimum and maximum chroma a* and b* values by multiplying the minimum and maximum intensity values to the predetermined weight values; and
assigning the weighted minimum and maximum chroma a* and b* as thresholds.

3. The method according to claim 2, wherein the predetermined weight value is 0.85 for the minimum intensity values and 1.15 for the maximum intensity values.

4. The method according to claim 1 further comprising:
in response to the L*a*b* values of the given pixel meeting the series of thresholds, searching the memory for a stored luminance value L* matching the luminance value L of the given pixel;
reassigning the stored luminance value L* a new weight value of zero "0";
treating the reassigned luminance value as being monochromatic; and
dynamically updating the predetermined weight values to include the new weight value.

5. The method according to claim 1 further comprising:
in response to the L*a*b* values of the given pixel not meeting at least one threshold in the series of thresholds, classifying the pixel as being a colored pixel.

6. The method according to claim 5 further comprising:
associating the colored pixels as content, wherein the output document includes the content against the monochrome background.

7. The method according to claim 1, wherein the scanned document has a color background and the output document has a monochromatic background.

8. A system for detecting background color of a scanned document, the system comprising:
a non-transitory storage device having stored thereon instructions for:
detecting the background color of a scanned document, the detecting comprising:
(a) for a given pixel (i,j), identifying a block of pixels around the given pixel, each pixel in the block having a respective luminance L* value and chroma a* and b* values;
(b) applying the L*a*b* values of the given pixel to a series of thresholds, the thresholds being based on weighted intensity values in the block;
(c) in response to the L*a*b* values of the given pixel meeting the series of thresholds, searching the memory for a stored luminance value L* matching the luminance value L of the given pixel, reassigning the stored luminance value L* a new weight value of zero, treating the reassigned luminance value as being monochromatic, classifying the pixel as being monochromatic and dynamically updating the predetermined weight values in the memory to include the new weight value;
repeating steps (a)-(c) for remaining pixels in the document; and
generating an output document using the classified pixels, the output document having a monochrome background;
at least one hardware processor being part of the computing device and configured to execute the instructions; and
a display device in communication with the computing device, the display device for displaying the output document.

9. The system according to claim 8, wherein the hardware processor is further operative to:
determine minimum and maximum intensity values in the block for the chroma a* and b*;
generate weighted minimum and maximum chroma a* and b* values by multiplying the minimum and maximum intensity values to the predetermined weight values; and
assign the weighted minimum and maximum chroma a* and b* as thresholds.

10. The system according to claim 9, wherein the predetermined weight value is 0.85 for the minimum intensity values and 1.15 for the maximum intensity values.

11. The system according to claim 8, wherein the hardware processor is further operative to:
in response to the L*a*b* values of the given pixel not meeting at least one threshold in the series of thresholds, classify the pixel as being a colored pixel.

12. The system according to claim 11, wherein the hardware processor is further operative to:
associate the colored pixels as content, wherein the output document includes the content against the monochrome background.

13. The system according to claim 11, wherein the series of thresholds are selected from the group consisting of:
the luminance value for the current pixel (i,j) being greater than the minimum luminance value for the block;
the chroma a* value for the current pixel (i,j) being greater than the weighted minimum chroma a* for the block and less than the weighted maximum chroma a* for the block; and
the chroma b* value for the current pixel (i,j) being greater than the weighted minimum chroma b* for the block and less than the weighted maximum chroma b* for the block.

14. The system according to claim 11, wherein the scanned document has a color background and the output document has a monochromatic background.

15. The system according to claim 8 further comprising:
a scanner in connection with a computing device, the scanner for generating an electronic document and transmitting the electronic document to the computing device.

16. A computer-implemented method for detecting background color of a scanned document, the method comprising:
at a server computer:

in response to acquiring a scanned document including colored content on a colored background canvas, obtaining predetermined weight values stored in a memory;

detecting the content pixels from the background pixels, comprising:

(a) for a given content pixel (i,j), identifying a block of pixels around the given pixel, each pixel in the block having a respective luminance L* and chroma a* and b* value;

(b) applying the L*a*b* values of the given pixel to a series of thresholds;

(c) in response to the L*a*b* values of the given content pixel meeting the series of thresholds, classifying the content pixel as being monochromatic and reassigning the stored luminance value L* matching the luminance of the given content pixel a new weight value of zero "0";

repeating steps (a)-(c) for remaining pixels in the document;

generating an output document using the classified pixels, the output document including a monochromatic content on the colored background; and transmitting the output document to a display device in communication with the server computer.

17. The method according to claim 16, wherein the series of thresholds are selected from the group consisting of:

the luminance value for the current pixel (i,j) being greater than the minimum luminance value for the block;

the chroma a* value for the current pixel (i,j) being greater than the weighted minimum chroma a* for the block and less than the weighted maximum chroma a* for the block; and the chroma b* value for the current pixel (i,j) being greater than the weighted minimum chroma b* for the block and less than the weighted maximum chroma b* for the block.

18. A system comprising a non-transitory storage device having stored thereon instructions for or implementing the method of claim 16.

* * * * *